United States Patent Office 3,428,203
Patented Feb. 18, 1969

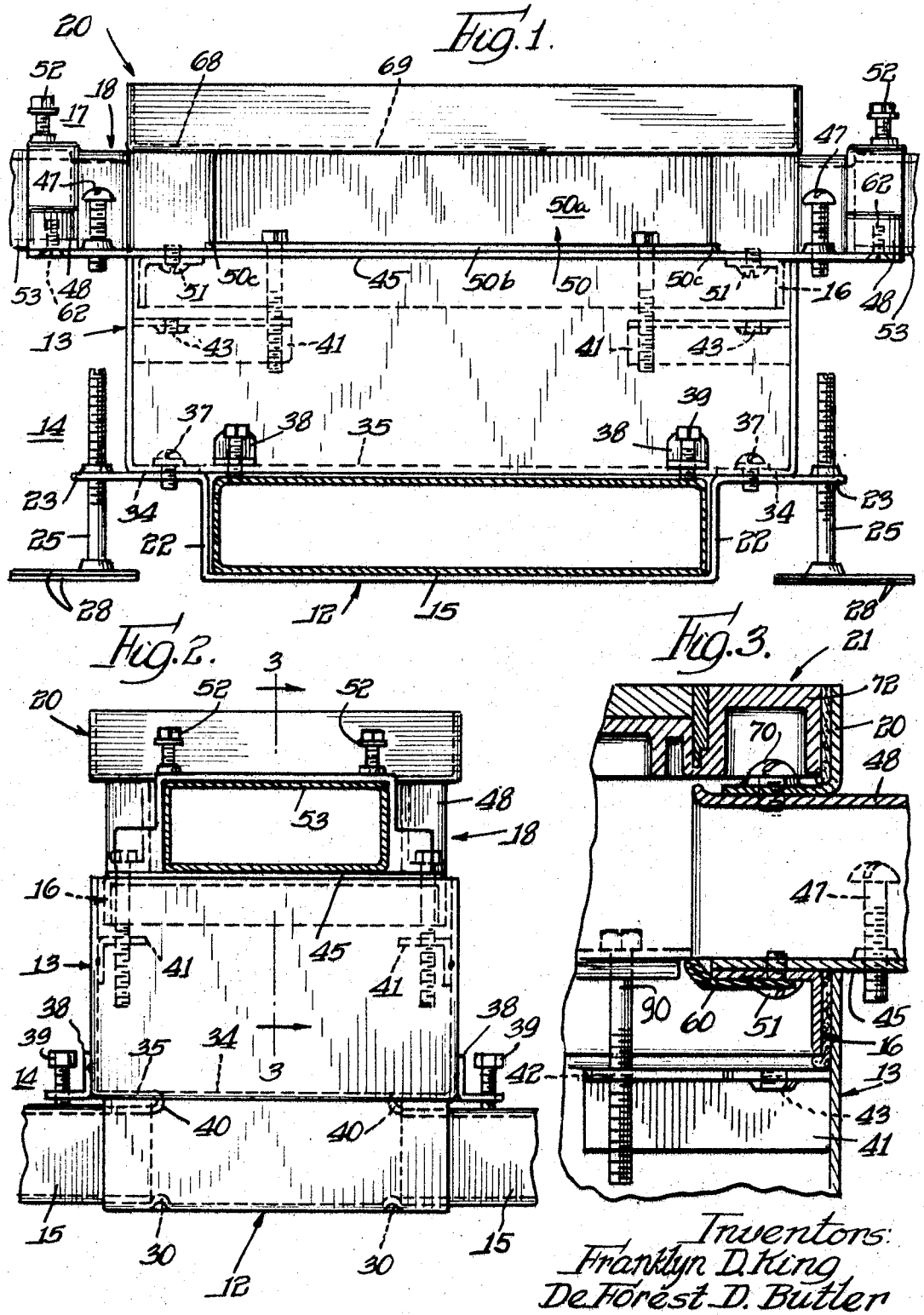

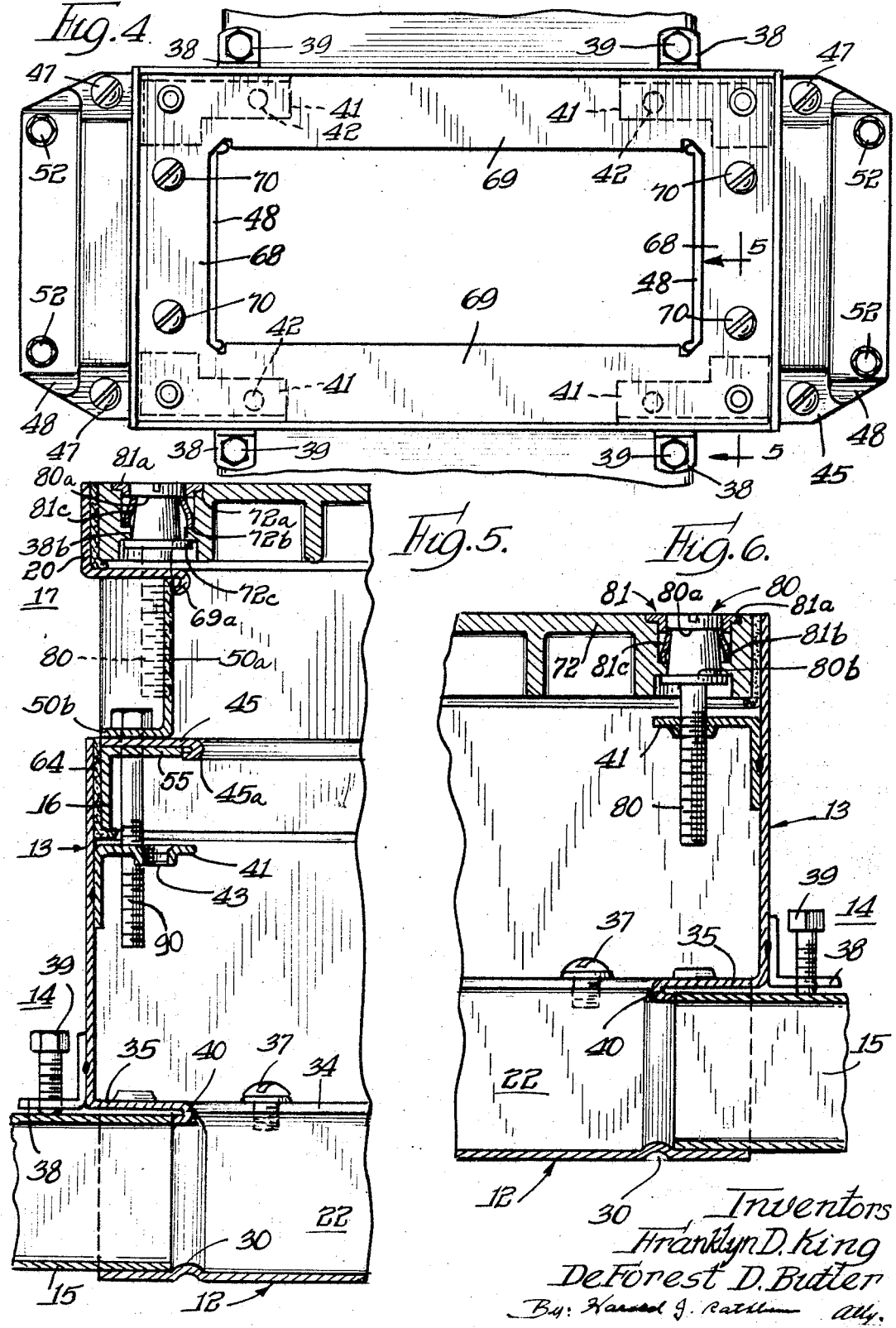

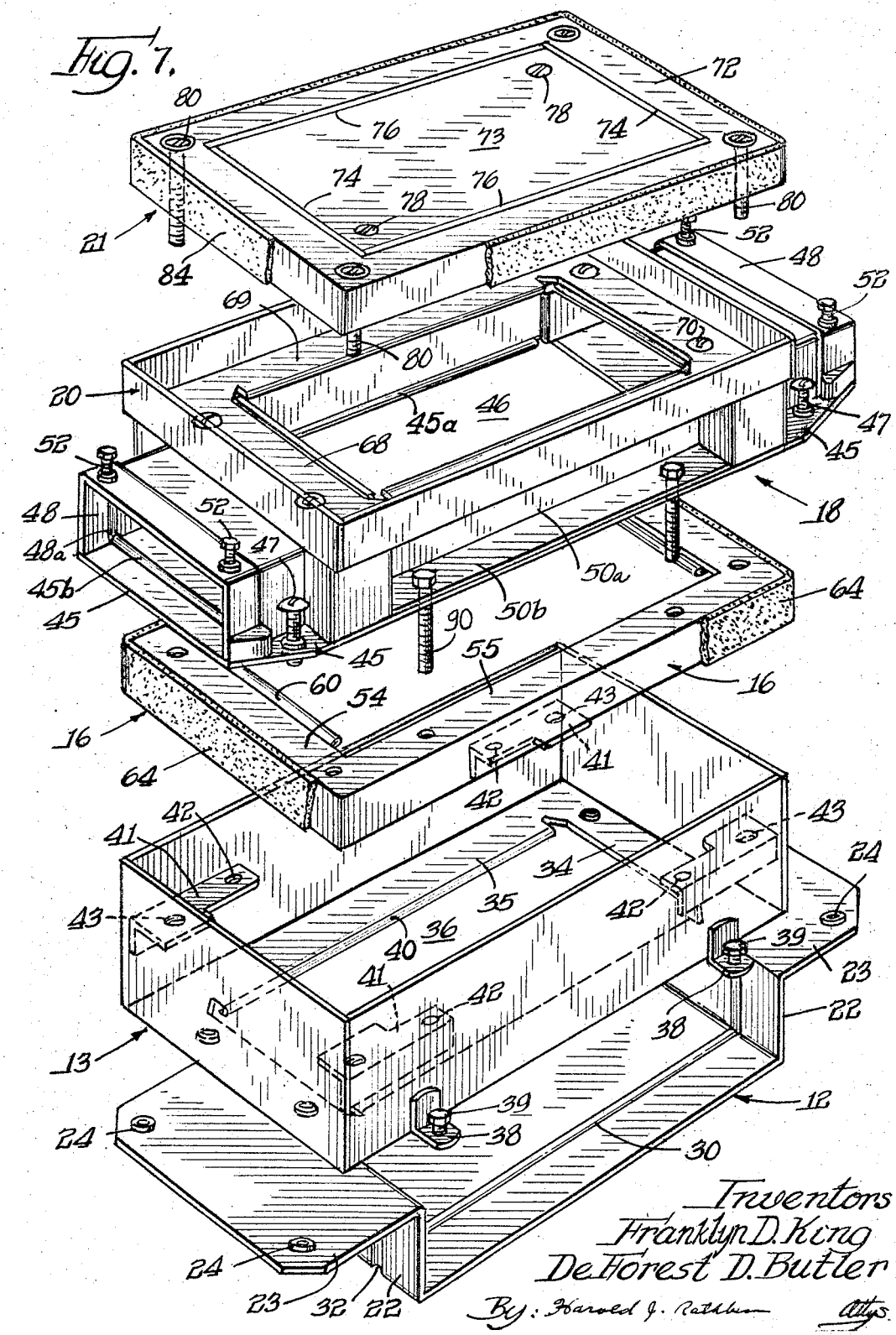

3,428,203
CONVERTIBLE SINGLE-LEVEL TO TWO-LEVEL JUNCTION BOX FOR UNDERFLOOR WIRING DUCT
Franklyn D. King and De Forest D. Butler, Lexington, Ky., assignors to Square D Company, Park Ridge, Ill., a corporation of Michigan
Filed Sept. 21, 1967, Ser. No. 669,529
U.S. Cl. 220—3.7          9 Claims
Int. Cl. H02g 3/08

ABSTRACT OF THE DISCLOSURE

A relatively deep access member forming the top of a lower level duct-receiving unit of a convertible underfloor junction box can receive selectively either an upper level duct-receiving unit or a cover plate assembly normally received by an access member of the upper level unit when the upper level unit is received in the access member of the lower level unit.

BACKGROUND OF THE INVENTION

Field of the invention

Junction box for use with embedded wiring conduit.

Description of the prior art

Single-level junction boxes are commonly used in underfloor duct installations to provide enclosed spaces for wiring extending between duct sections at the same level and floor outlets and double-level boxes are commonly used to provide enclosed spaces for wiring extending between lower and upper levels of duct and between either level of duct and floor outlets. As shown in U.S. patent application Ser. No. 638,442, filed on May 15, 1967, and assigned to the assignee of this application, prior underfloor junction boxes have been arranged for disassembly and re-assembly so that a single-level junction box can be converted at the job site into a two-level junction box and vice versa by interchange of base members and the addition or removal of filler plates. However, there is no provision in the prior art of a single-level junction box complete with a cover plate assembly that can be converted into a two-level junction box without an interchange of base members.

SUMMARY OF THE INVENTION

In accordance with this invention, a junction box for underfloor wiring duct that is convertible from a single-level to a two-level junction box and vice versa is provided in which an access member forming part of a duct-receiving lower level unit is arranged to accept selectively a duct-receiving upper level unit or a cover plate assembly normally carried by the upper level unit. With the cover plate assembly inserted in the access member of the lower level unit, a complete single-level junction box is provided, and a second complete single-level junction box is provided by adding an additional cover plate assembly to the upper level unit with or without removal of a lower junction member of the upper level unit. Upon removal of the cover plate assembly from the lower level unit, the upper level unit can be mounted thereon by means of the junction member, and the cover plate assembly inserted in the access member of the upper level unit thereby to provide a two-level junction box. It should be noted that the conversion does not remove any part of the lower level unit except the cover plate assembly. Thus, a box in accordance with this invention can be assembled with lower level sections of an underfloor duct installation and a first layer of a concrete floor can be poured up to the level of the cover plate assembly. After the first floor layer has hardened, the cover plate assembly can be removed from the access member of the lower unit, the upper level unit can be inserted therein, and the cover plate assembly can be placed in an access member of the upper level unit. Upper level duct sections can then be installed and a second layer of the floor poured. Other uses for the convertible box will become apparent. For example, the upper level unit can be installed with duct sections in an upper floor and the lower level unit added so that it is suspended below the floor. Duct sections can then be installed in the lower unit and covered by a false ceiling.

BRIEF DESCRIPTION OF THE DRAWINGS

FIG. 1 is a side elevation of a junction box in accordance with this invention with an upper level unit mounted on a lower level unit to form a two-level junction box;
FIG. 2 is an end elevation of the junction box of FIG. 1;
FIG. 3 is a fragmentary sectional view taken generally along the line 3—3 of FIG. 2;
FIG. 4 is a top plan view of the junction box of FIG. 1 with a cover plate assembly removed;
FIG. 5 is a sectional view taken generally along the line 5—5 of FIG. 4 with the cover plate assembly in the upper level unit;
FIG. 6 is a sectional view similar to FIG. 5 with the upper level unit omitted and the cover plate assembly in the lower level unit; and
FIG. 7 is an exploded view of the junction box as shown in FIGS. 1, 2, and 5.

DESCRIPTION OF THE PREFERRED EMBODIMENT

Referring to the drawings, a junction box constructed in accordance with this invention comprises a channel-shaped base member 12, a relatively deep upwardly-opening box-like lower level access member 13 secured to the base member 12 to define a lower level unit 14 having a pair of aligned access openings which receive the respective end portions of a pair of relatively wide underfloor feeder duct sections 15, a junction member 16 forming part of an upper level unit 17 also including an upper level duct-receiving assembly 18 and a relatively shallow upwardly-opening upper level access member 20 for receiving a cover plate assembly 21 which can also be received selectively in the lower level access member 13.

A pair of upstanding side walls 22 of the base member 12 have respective out-turned flanges 23 each of which has a respective pair of threaded openings 24 (FIG. 7) at its outer corners which receive respective leveling and mounting screws 25 (FIG. 1). Each screw 25 is slotted at its upper end and has a lower head portion rotatably trapped between a pair of perforated plate members 28 secured together in any suitable manner and which serve as a mounting foot. The base member 12 has a spaced pair of inwardly-directed ribbed portions 30 extending along its bottom wall and similar and aligned ribbed portions 32 (FIG. 7) extending along both of the side walls 22 which function as stops for the duct sections 15.

The lower level access member 13 has a bottom wall comprising two inturned end flanges 34 and two inturned side flanges 35 which define a central opening 36 and rests at opposite ends on the top surfaces of the respective flanges 23 of the base member 12 to which it is secured at each end by a pair of screws 37 passing through openings in the flanges 34 and threaded into the flanges 23. The assembled members 12 and 13 thus define the openings which receive the respective end portions of the duct sections 15. Four angle-brackets 38, one at each lower corner of the access member 13, receive grounding set-screws 39 which, when tightened, provide good electrical connections between the duct sections 15 and the lower level unit 14. The side flanges 35 have their edges turned over as at 40 to define additional stops for the respective duct sections 15. Stop-welded near the top of the side walls of the access member 13 are four inner corner brackets 41 which serve either as mounting means for the upper level unit 17 including the cover plate assembly 21 or the cover plate assembly alone depending upon whether or not the upper level unit 17 is to be assembled with the lower level unit 14 at the particular time. Each bracket 41 has a pair of threaded holes 42 and 43 for purposes to be described.

The upper level duct-receiving assembly 18 comprises a base plate 45 having a central opening 46 and a plurality of tapped holes for leveling screws 47, a pair of identical duct-receiving members 48, which preferably are castings, secured respectively to opposite ends of the base plate 45, and a pair of side wall members 50 in the form of metal angles each having an upright portion 50a and a base portion 50b. The edges of the base plate defining the longer sides of the opening 46 are turned over as at 45a (FIG. 5) to eliminate exposed sharp edges. Marginal areas of the upright portions 50a at opposite ends are received in respective recesses in the members 48, and end portions 50c (FIG. 1) of the base portions 50b are trapped between the members 48 and the base plate 45, screws 51 being used to retain the base plate 45, the junction member 16, members 48, and side wall members 50 together. Each duct-receiving member 48 is provided with a pair of screws 52 for establishing good grounding connections with relatively narrow distribution duct sections 53 received respectively in the members 48. The members 48 have internal shoulders 48a and the base plate 45 has ribbed portions 45b which serve as stops for the duct sections 53.

The junction member 16 comprises a downwardly-opening box-like frame having its upper wall defined by a pair of end flanges 54 and a pair of side flanges 55 like the respective flanges 34 and 35 of the lower access member 13. Plate members 60 having turned-over edges are spot-welded to the respective end flanges 54 to eliminate exposed sharp edges. A foam rubber gasket 64 is adhesively secured to the outer side walls of the junction member 16.

The upper level access member 20 comprises an upwardly-opening box-like frame having a bottom wall defined by a pair of end flanges 68 and a pair of side flanges 69 like the respective flanges 34 and 35 and 54 and 55 of the members 13 and 16 and is secured to the duct-receiving assembly 18 by four screws 70 two of which are threaded into each of the duct-receiving members 48. Preferably the outer edges of the side flanges 69 are turned over as at 69a (FIG. 5).

The cover plate assembly 21 includes a rectangular cover frame 72, a rectangular cover plate 73 and a four-piece tile trim, including two short pieces 74 and two long pieces 76. The cover plate 73 is removably secured to the cover frame 72 by a pair of screws 78. The cover plate assembly 21 may be adjustably secured in the upper-access member 20 by four leveling screws 80 threaded through respective openings in the bottom wall of the member 20. Each duct-receiving member 48 has recesses which loosely receive and conceal the inner end portions of a respective one of a pair of screws 80, as best shown in FIG. 5.

When the cover plate assembly 21 is to be mounted in the lower level access member 13, the screws 80 are threaded into the holes 43 of the brackets 41. The cover frame 72 has a plurality of holes through which the leveling screws 80 extend, each hole being provided with a plurality of portions of different diameters so as to provide a cover frame with a pair of upwardly-facing annular surfaces 72a and 72b and a downwardly-facing shoulder 72c in each hole. The head portion of each screw 80 is formed with a plurality of portions of different diameters so as to provide each screw 80 with a downwardly-facing surface 80a and an upwardly-facing surface 80b. The screws 80 are permanently assembled with a cover frame 72 by a plurality of respective retainers 81, as described more in detail in application Ser. No. 638,923 filed May 16, 1967, and assigned to the assignee of this invention. Each retainer 81 is in the form of a flanged split sleeve including a flange portion 81a and a body portion 81b having a pair of inwardly-bent prong portions 81c. The screws 80 are inserted into their respective holes from the bottom and retainers 81 are forced in around the screw from the top. The lower end of the retainers 81 engages the respective shoulders 72b and the inwardly-bent prong portions 81c engage the downwardly-facing shoulder 80a on the screws, thus to hold the screws 80 in position.

A foam rubber gasket 84 is adhesively secured to the outer side walls of the cover frame 72. Suitable gasket material (not shown) may be provided between the bottom of the cover plate 73 and the cover frame 72.

When the cover plate assembly 21 is removed from the lower level unit 14, the upper level unit 17 may be mounted in position thereon. This is accomplished by positioning the junction member 16, which is secured to the base plate 45, within the access member 13. A plurality of screws 90 having their head portions resting on the flange surfaces 50b pass through aligned openings in the flanges 50b, the base plate 45, and the side flanges 55 of the member 16, and are threaded into the threaded openings 42 in the brackets 41 to secure the upper level unit in place.

In use of the junction box of this invention, the base member 12 and the lower level access member 13 are assembled and then the lower level unit 14 is leveled by means of the mounting screws 25. The cover plate assembly 21 is then mounted in the member 13, as shown in FIG. 6, by means of the screws 80 which enter the respective threaded openings 43 of the corner brackets 41. A first layer of a concrete floor may then be poured up to the top edge of the lower unit 14. After the first floor layer has hardened, the cover plate assembly 21 is removed and the upper level unit 17 is mounted on the lower level unit 14 by mounting screws 90 threaded into the respective openings 42 in the corner brackets 41. The cover plate assembly 21 is placed in the upper level access member 20 of the upper level unit 17 and secured by the screws 80. Concrete may then be poured up to the top edge of the access member 20 embedding the duct sections 53.

Thus it is possible by means of a junction box in accordance with this invention to have distribution ducts and feed ducts spaced apart vertically a considerable distance within a concrete floor, or it is possible to have the feed ducts 15 suspended below the level of the floor and eventually covered by a false ceiling in the room below.

We claim:

1. A convertible single-level to two-level junction box for underfloor wiring duct, said junction box comprising a lower level duct-receiving unit having an upwardly-opening lower level access member, a cover plate assembly removably mountable in telescoping relationship with the lower level access member, and an upper level duct-receiving unit having a portion mountable in telescoping relationship with said lower level access member upon removal of said cover plate assembly therefrom and having an upwardly-opening upper level access member, said cover plate assembly being removably mountable in telescoping relationship with the upper level access member, said upper level duct-receiving unit having means for receiving only ducts which extend in a first direction and have a generally rectangular cross section, and said lower level duct-receiving unit having means for receiving only ducts which extend in a second direction transverse to said first direction and have a generally rectangular cross section.

2. A junction box in accordance with claim 1 wherein the lower level duct-receiving unit includes a channel-shaped base member having respective side flanges at the free ends of the side walls and extending parallel to the bottom wall, and the lower level access member is an upwardly-opening box like frame secured at opposite ends to the flanges, whereby duct-receiving openings are thereby defined for the lower level duct-receiving unit.

3. A junction box in accordance with claim 1 wherein the lower level duct-receiving unit includes a channel-shaped member having a bottom wall and upwardly-directed side walls, flanges extend outwardly from the free ends of the side walls, respectively, adjustable leveling and mounting screws are threaded into openings in the respective flanges, the lower level access member has a bottom wall and is mounted on said flanges in non-interfering relation to said screws, said bottom wall of said lower level access member and said bottom wall and side walls of the channel define two aligned duct-receiving openings for receiving respective end portions of duct sections, a plurality of mounting bracket means are secured in said lower lever access member, and a cover plate assembly is removably secured to said brackets.

4. A junction box in accordance with claim 1 wherein the upper level duct-receiving unit comprises a duct-receiving assembly and a junction member, said junction member being secured to the bottom of the duct-receiving assembly and removably mountable in the lower level access member.

5. A junction box in accordance with claim 4 wherein the duct-receiving assembly comprises a generally flat base plate and two spaced-apart duct-receiving members secured thereto at opposite ends, respectively, the junction member is secured to the bottom of the base plate, and the upper level access member is secured to the top of the duct-receiving members.

6. A junction box in accordance with claim 5 wherein said duct-receiving members and said base plate define two duct-receiving openings for respective duct sections and the upper level access member is a box-like frame secured to said duct-receiving members.

7. A junction box in accordance with claim 5 wherein the junction member is a downwardly-opening box-like frame telescopically mountable within said lower level access member, and a plurality of mounting bracket means are disposed in said lower level access member, the extent of the telescoping being limited by the bracket means.

8. A junction box in accordance with claim 1 wherein the upper level duct-receiving unit comprises a duct-receiving assembly having two duct-receiving members and a base plate, the assembly defining a pair of aligned upper level duct-receiving openings, each upper level opening being for a duct section extending in said first direction, and the lower level duct-receiving unit comprises a base member and a lower level access member joined to define a pair of lower level duct-receiving openings, each lower level opening being for a duct section extending in said second direction.

9. A junction box in accordance with claim 8 wherein each of said duct-receiving members is provided with a grounding screw for a duct section extending in said first direction, and the lower level access member is provided with a pair of grounding screws respectively for a pair of duct sections extending in said second direction.

References Cited

UNITED STATES PATENTS

| | | |
|---|---|---|
| 2,398,782 | 4/1946 | Gent et al. |
| 2,622,756 | 12/1952 | Appleton _____ 220—3.94 |
| 3,318,476 | 5/1967 | Clark _____ 220—3.8 X |

FOREIGN PATENTS

| | | |
|---|---|---|
| 22,719 | 12/1892 | Great Britain. |

THERON E. CONDON, *Primary Examiner.*

J. R. GARRETT, *Assistant Examiner.*